July 22, 1930.  J. BURKHARDT  1,771,029

MOTION PICTURE FILM AND METHOD OF PRODUCING

Filed Jan. 2, 1929

INVENTOR
Jakob Burkhardt
BY Chappell Earl
ATTORNEYS

Patented July 22, 1930

1,771,029

UNITED STATES PATENT OFFICE

JAKOB BURKHARDT, OF DETROIT, MICHIGAN, ASSIGNOR TO THIRD DIMENSION PICTURES, INC., OF NEW YORK, N. Y., A CORPORATION OF NEW YORK

MOTION-PICTURE FILM AND METHOD OF PRODUCING

Application filed January 2, 1929. Serial No. 329,693.

The main objects of this invention are:

First, to provide a motion picture film for producing the appearance of relief or third dimension pictures.

Second, to provide a film of this character which necessitates only slight modification in projecting machines now in extensive use to adapt the same to the films.

Third, to provide a motion picture film for use in producing stereoscopic or third dimensional effects in which the plastic or relief portion of the picture is very clearly defined.

Fourth, to provide a method of producing films of this class or having these characteristics which makes it possible to take the background and foreground pictures to be associated independently and then combine them into a film for producing the relief effects.

Fifth, to provide a method having these advantages which may be economically practiced.

Objects relating to details and economies of my invention will appear from the description to follow. The invention is defined and pointed out in the claims.

A structure which is a preferred embodiment of my invention is illustrated in the accompanying drawing, forming a part of this application, in which.

In the accompanying drawing, the various figures are fragmentary and conventionalized, only such portions being shown as it is believed will enable a complete understanding of the applicant's invention and the use thereof.

Figure 1:
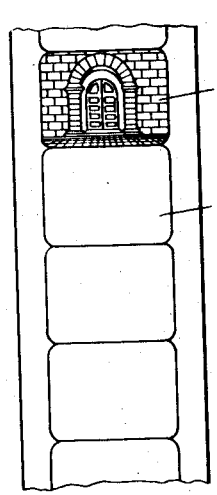
Fig. 1 is a fragmentary view of a background negative, only one picture being shown, the film being conventionally illustrated.
Figure 2:
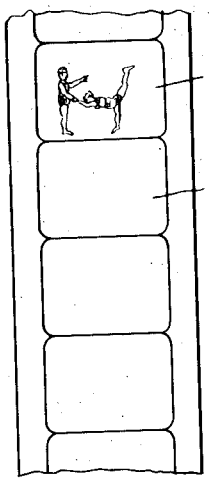
Fig. 2 is a fragmentary view of a foreground negative, only one picture being shown, the film being conventionally illustrated.

The background negatives are represented at 1, Fig. 1, and the foreground or image or action negatives are represented at 2, Fig. 2. These negatives are taken as desired, having in mind only the suitability of the background for the foreground picture.

The foreground or image pictures are taken on a black or other background so that the images appear in black on white, as these are used in this art.

Figure 3:
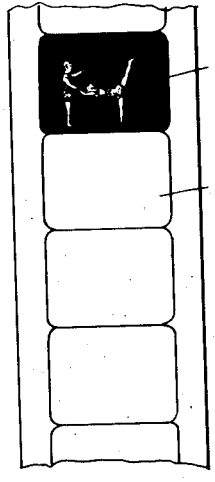
Fig. 3 is a fragmentary view of a positive of the foreground picture shown in Fig. 1.
Figure 4:
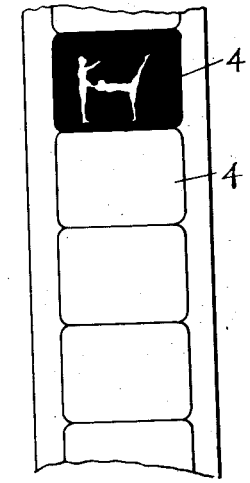
Fig. 4 is a fragmentary view of the positive of Fig. 3 after it has been treated to eliminate detail, thus providing a "dupe" of the foreground.

To secure a "dupe" or mask of the foreground I then prepare a positive of the foreground as indicated at 3, Fig. 3, the figures then becoming white and the background black. This foreground positive is then treated by subjecting to a reducing solution whereby the detail of the image or foreground picture is eliminated, as is indicated at 4, Fig. 4.

The steps in printing the film from the background and foreground negatives and this "dupe" may be considerably varied; that is, the order in which the printing is done may be varied, the object being to print the background and the "dupe" or mask in superimposed relation on alternate spaces of the film and the foreground pictures in alternating relation with the background pictures so that the background and foreground pictures are in associated pairs with a mask of the foreground of the pair in superimposed relation with the background of the pair.

Figure 5:
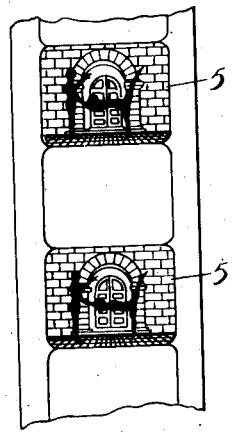
Fig. 5 is a fragmentary view of a film illustrating the background and the "dupe" printed in superimposed relation in alternating spaces and as it would appear after developing.
Figure 6:
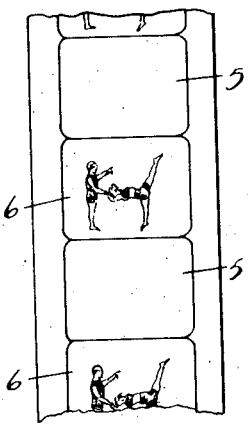
Fig. 6 is a fragmentary view of the film of Fig. 5 showing the foreground picture printed in alternating relation with the background, the background being shown as it would appear undeveloped.

I illustrate the background and the mask in superimposed alternating relation at 5 in Fig. 5 as they would appear on the developed film. It is to be understood that they are printed in such relation but that the film is not developed until after the foreground pictures have been printed in alternating relation with the background pictures as is indicated at 6 in Fig. 6, the background spaces being left blank as in the undeveloped pictures.

Figure 7:
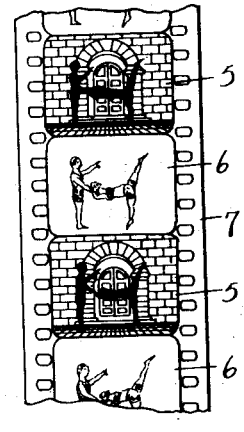
Fig. 7 is a fragmentary view of the finished developed film showing the background and foreground pictures in alternating relation with masks of the foreground on the background.
Figure 9:
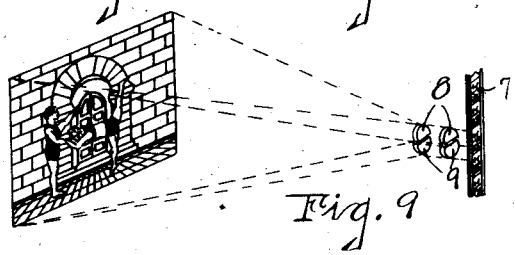
Fig. 9 is a fragmentary perspective view illustrating the simultaneous projection of one of the foreground and one of the background pictures in superimposed relation, thereby producing the stereoscopic or third dimensional effects.

The developed film 7, see Fig. 7, shows the background pictures with the masks thereon and the foreground pictures in alternating relation so that the film may be passed through a projecting machine having a pair of lenses 8 and 9, the pairs of pictures, that is, the associated foreground and background pictures being simultaneously projected in superimposed relation with the foreground or image pictures registering with their masks on the background pictures. This may be done with standard types of machines now in use, it only being necessary to adapt these machines to these films to provide means for feeding the films two spaces at a step and to simultaneously project the associated pairs of background and foreground pictures. The result is a highly satisfactory relief or stereoscoping effect.

Figure 8:
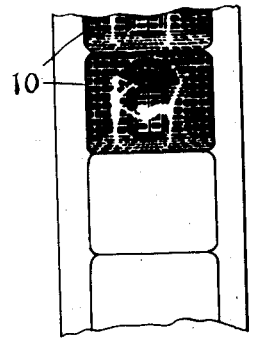
Fig. 8 is a fragmentary view illustrating a slightly modified method of producing background pictures with the mask of the foreground thereon.

In Fig. 8 I illustrate an alternative method of printing in which the foreground mask is embodied in the background, as at 10, so that the mask and background may be simultaneously printed on the film.

It is believed that the foregoing description and disclosure will enable those skilled in the art to practice my invention with any of the various modifications and adaptations of which it is capable that may be found best suited to the particular situation. I have not attempted to illustrate or describe such modifications and adaptations as it seems unnecessary so to do.

Having thus described my invention, what I claim as new and desire to secure by Letters Patent, is:

1. A motion picture film comprising a series of background pictures and a series of action pictures, the pictures of the two series being arranged in alternating relation, each background picture having a mask of one of the adjacent action pictures.

2. A motion picture film having in alternating relation background pictures and image pictures, each background picture having a mask of one of the adjacent image pictures.

3. A motion picture film having a background and foreground pictures in alternating relation, each background picture including a mask of an adjacent foreground picture.

4. A moving picture film having foreground and background pictures in alternating relation, the background pictures having masks of the foreground pictures thereon.

5. A motion picture film comprising a series of background pictures, and a series of image pictures arranged in pairs, the background picture of each pair having thereon a mask of the image picture.

6. A motion picture film comprising a series of background pictures, and a series of foreground pictures arranged in pairs, the background picture of each pair having thereon a mask of the foreground picture of the pair.

7. A moving picture film having a series of juxtaposed pairs of background and foreground pictures, the background pictures having masks of the foreground pictures.

8. A motion picture film having a series of background pictures and a series of foreground pictures, the pictures of the two series being arranged in paired relation, each background picture having a mask of the foreground picture of the pair.

9. A motion picture film having background pictures and action pictures arranged in paired relation, each background picture having a mask of the action picture of the pair.

10. A motion picture film having background and foreground pictures in paired relation, each background picture including a mask of the foreground picture of the pair.

11. The method of producing motion picture films from a negative consisting of a series of background pictures and a negative consisting of a series of image pictures, the image pictures being taken on a plain background, including making a dupe or mask from the image negative by printing a positive of the image negative and treating to eliminate image detail, and printing the background, image and dupe on a single film with the background and image pictures in non-superimposed paired relation and the dupe or mask of the image of the pair in superimposed relation to the background of the pair.

12. The method of producing motion picture films from a negative consisting of a series of background pictures and a negative consisting of a series of image pictures, the image pictures being taken on a plain background, including making a dupe from the image negative, and printing the background, image pictures and the dupe on a single film with the background and dupe in superimposed relation and the image pictures in alternating relation with the background pictures.

13. The method of producing motion picture films from a negative consisting of a pair of background pictures and a negative consisting of foreground pictures, the foreground pictures being taken before a plain background so that the foreground appears as black on white, including making a dupe from the foreground negative and treating to eliminate the foreground detail so that the foreground becomes white on a black background, and printing the background and the foreground in alternating relation and the dupe in superimposed relation to the background.

14. The method of producing motion picture films from a background negative and an action negative including making a positive of the action negative and treating to eliminate detail thereby providing a mask or dupe of the action negative, and printing the background and foreground and the dupe with the background and action pictures in juxtaposed pairs and with the mask of the action picture of the pair in superimposed relation to the background picture of the pair.

15. The method of producing motion picture films from a negative consisting of a series of background pictures and a negative consisting of a series of foreground pictures including making a dupe of the foreground negative, and printing the background, foreground and dupe with the background and foreground pictures in non-superimposed paired relation and the dupe of the foreground picture of the pair in superimposed relation to the background of the pair.

16. The method of producing motion picture films from a negative consisting of a series of background pictures and a negative consisting of a series of image pictures including printing the background and image pictures in non-superimposed paired relation with a mask of the image picture of the pair in superimposed relation to the background picture of the pair.

17. The method of producing motion picture films including printing on a single film in alternating relation foreground and background pictures and a mask or dupe of one of the adjacent foreground pictures in superimposed relation to the background picture.

18. The method of making motion picture films including printing in non-superimposed paired relation, a foreground picture and a background picture and a mask of the foreground picture of the pair in superimposed relation with the background picture of the pair.

19. The method of producing motion picture films including printing on a single film in alternating relation foreground and background pictures, the background picture including a mask of one of the adjacent foreground pictures.

20. The method of making motion picture films including printing in non-superimposed paired relation, a foreground picture and a background picture, the background picture including a mask of the foreground picture of the pair.

In witness whereof I have hereunto set my hand.

JAKOB BURKHARDT.